(12) United States Patent
Wang et al.

(10) Patent No.: US 10,400,132 B2
(45) Date of Patent: Sep. 3, 2019

(54) HIGH SOLIDS CONTENT DENDRIMER POLYMER COMPOSITION

(75) Inventors: Shaofeng Wang, Singapore (SG); Swee How Seow, Singapore (SG); Zeling Dou, Singapore (SG); Thomas F. Choate, Pinkney, MI (US); Xiaoqun Ye, Singapore (SG)

(73) Assignee: NIPSEA TECHNOLOGIES PTE LTD, Singapore (SG)

( * ) Notice: Subject to any disclaimer, the term of this patent is extended or adjusted under 35 U.S.C. 154(b) by 0 days.

(21) Appl. No.: 14/232,555

(22) PCT Filed: Aug. 22, 2012

(86) PCT No.: PCT/SG2012/000296
§ 371 (c)(1),
(2), (4) Date: Jan. 13, 2014

(87) PCT Pub. No.: WO2013/028133
PCT Pub. Date: Feb. 28, 2013

(65) Prior Publication Data
US 2014/0142237 A1    May 22, 2014

(30) Foreign Application Priority Data

Aug. 23, 2011 (GB) .................................. 1114554.7

(51) Int. Cl.
| | | |
|---|---|---|
| C09D 175/06 | (2006.01) | |
| C09D 133/08 | (2006.01) | |
| C08G 18/66 | (2006.01) | |
| C08G 18/79 | (2006.01) | |
| C08G 18/24 | (2006.01) | |
| C08G 18/32 | (2006.01) | |
| C08G 18/42 | (2006.01) | |
| C08G 83/00 | (2006.01) | |
| C09D 201/00 | (2006.01) | |
| C08L 75/06 | (2006.01) | |

(52) U.S. Cl.
CPC ......... *C09D 133/08* (2013.01); *C08G 18/246* (2013.01); *C08G 18/3212* (2013.01); *C08G 18/42* (2013.01); *C08G 18/664* (2013.01); *C08G 18/792* (2013.01); *C08G 83/006* (2013.01); *C09D 175/06* (2013.01); *C09D 201/005* (2013.01); *C08L 75/06* (2013.01)

(58) Field of Classification Search
CPC .................................................. C09D 201/005
USPC ....................................................... 524/379
See application file for complete search history.

(56) References Cited

U.S. PATENT DOCUMENTS

| | | | | |
|---|---|---|---|---|
| 6,187,897 | B1* | 2/2001 | Kawashima et al. | 528/310 |
| 6,515,192 | B1* | 2/2003 | Rink et al. | 585/16 |
| 6,803,393 | B2* | 10/2004 | Blum | C08G 18/8175 522/104 |
| 6,806,314 | B2 | 10/2004 | Fenn | |
| 2002/0026015 | A1* | 2/2002 | Ramesh | 525/437 |
| 2006/0155017 | A1 | 7/2006 | Devadoss et al. | |
| 2007/0045596 | A1* | 3/2007 | King | C08J 7/047 252/582 |
| 2008/0180803 | A1* | 7/2008 | Seybert | C09D 201/005 359/642 |
| 2010/0028582 | A1* | 2/2010 | Joch et al. | 428/36.91 |
| 2010/0190881 | A1* | 7/2010 | Steinmann | 522/8 |
| 2011/0245406 | A1 | 10/2011 | Klein et al. | |
| 2012/0183692 | A1* | 7/2012 | Becker, IV | C09D 201/005 427/289 |

FOREIGN PATENT DOCUMENTS

| | | |
|---|---|---|
| CN | 101880360 A | 11/2010 |
| JP | 2006160789 A | 6/2006 |
| WO | 2000017279 A1 | 3/2000 |
| WO | 2002032982 A1 | 4/2002 |

OTHER PUBLICATIONS

Mol-Instincts. ChemEssen, Inc. Evidentiary reference. Real Time Predictor. 2,7-dimethyloctane-2,7-diol. Accessed at http://realtime.molinstincts.com/chemical-info.ce?ID=LZMSJLJRUYKOQD-UHFFFAOYSA-N. Accessed on Dec. 16, 2015.*
Sanko. Sanko co. Ltd. Evidentiary reference. HCA, 9,10-Dihydro-9-oxa-10-phos phaphenanthrene-10-oxide. Accessed at http://www.sanko-inet.co.jp/english/business/product/hca/. Accessed on Dec. 16, 2015.*
International Preliminary Report on Patentability for PCT/SG2012/000296, dated Sep. 24, 2013, 5 pages.
International Search Report for PCT/SG2012/000296, dated Oct. 26, 2012, 4 pages.

* cited by examiner

*Primary Examiner* — Michael M Dollinger
(74) *Attorney, Agent, or Firm* — Hovey Williams LLP

(57) ABSTRACT

The present invention relates to a polymer composition comprising: (i) one or more dendritic polymers; and (ii) a reactive diluent that is capable of being chemically coupled to the functional groups of the dendritic polymers, wherein when the dendritic polymer is coupled to the reactive diluent in the presence of a cross-linker, a polymerized solid is formed at high concentrations in a liquid medium. The present invention further relates to methods of preparing the polymer composition and its use in forming coatings.

21 Claims, No Drawings

HIGH SOLIDS CONTENT DENDRIMER POLYMER COMPOSITION

RELATED APPLICATION

The present application is a national stage application under 35 U.S.C. § 371 of International Application No. PCT/SG2012/000296, filed Aug. 22, 2012, which is incorporated by reference herein in its entirety.

TECHNICAL FIELD

The present invention relates to a polymer composition having a high solids content, methods of preparing the same and uses thereof.

BACKGROUND

Dendritic polymers (or "dendrimers") have been used in the field of manufacturing protective coatings due to its unique structure which leads to the formation of high performance coatings. Protective coatings provide protection for a surface from damage by the elements such as water, snow, ice, heat, dirt, smog, bird droppings, chemical attacks and acid precipitation.

As dendritic polymers are polymers with hyperbranched structures which can comprise a high number of reactive functional groups exposed at the peripheral edges of the hyperbranched dendrimer molecule, they are considered as one of most promising resin systems to provide films with high cross-linking density and high surface protection performance. Depending on the degree of branching, dendritic polymers may be classified into first, second, third, fourth or even fifth generation dendritic polymers. A first generation dendritic polymer may theoretically have a total of eight peripheral reactive functional groups, whereas a second generation polymer will have theoretically sixteen peripheral functional groups, and whereas a third generation polymer will have theoretically thirty two peripheral functional groups and so forth. The total number of peripheral functional groups per molecule is also referred to as the peripheral functionality.

The molecules of dendritic polymers mimic the hydrodynamic volumes of spheres, and as such, they can be used to provide coatings of high molecular weights whilst maintaining relatively low viscosity. At the same time, dendritic polymers provide coatings with high crosslink density at the same time keep its flexibility.

Conventionally, protective coatings comprising dendritic polymers are provided as organic solvent-based coating systems due to the dendritic polymer's lack of solubility in water. Such solvent-based systems provide excellent abrasion resistance, flexibility, adhesion, and chemical resistance. However, due to the presence of organic solvents which are volatile in nature, coatings prepared from solvent-based systems will typically emit an undesirably high level of volatile organic compounds ("VOC"). in many countries have driven coating manufacturers to explore the possibilities of coating compositions having significantly reduced VOC emissions.

Further, another challenge for solvent-based coatings is to improve the solid content. One way to achieve this objective is to reduce the quantity of organic solvents so as to increase solid substances to obtain high solid coatings. However, lower solvent content will increase viscosity and sacrifice paint workability.

Additionally, dendritic polymers, especially high generation dendritic polymers, such as Boltorn H30™ and Boltorn H40™, are considered as a new class of macromolecular compounds, and are used in high performance coatings. However, these dendritic polymers typically possess melting points above 60° C. and require dissolution in organic solvents. While using organic solvents will improve the film forming properties for these dendritic polymer compositions, the trade-off is that solvent-based coatings may display inferior pencil hardness and chemical resistance if solvent is trapped in the highly cross-linked cured film and cannot be removed. The hazardous nature of organic solvents in a coating composition also limits the area of applications.

Accordingly, there is a need to provide a polymer composition that overcomes, or at least ameliorates, one or more of the disadvantages described above. In particular, it is an object of the present invention to provide a polymer composition that is capable of forming high performance coatings, with near-zero or zero VOC emissions and at the same time, display improved pencil hardness, chemical resistance relative to conventional solvent-based coatings.

SUMMARY

In a first aspect, there is provided a polymer composition comprising: (i) one or more functionalized dendritic polymers; and (ii) a reactive diluent that is capable of being chemically coupled to the functional groups of the dendritic polymers, wherein when said dendritic polymer is coupled to said reactive diluent in the presence of a cross-linker, a polymerized solid is formed at high concentrations in a liquid medium.

In one embodiment, the concentration of the polymerized solid is at least 55% in the liquid medium.

In one embodiment, the liquid medium may comprise an organic solvent or an aqueous solvent. In another embodiment, the polymer composition may be substantially devoid of the liquid medium.

Advantageously, the presence of the reactive diluent substantially reduces or completely negates the need for the use of an organic solvent, such as acetones, dimethylformamides and/or the like, for dissolving the dendritic polymers. As a result, the disclosed polymer compositions can be advantageously used to prepare high quality polymer coatings having substantially reduced volatile organic compounds (VOC) emissions. Even more advantageously, the disclosed polymer compositions can be used to prepare coatings having zero or near-zero VOC emissions.

The disclosed coating composition may comprise functional groups which are moisture-curable, heat-curable, radiation-curable or curable by other methods known in the art. In one embodiment, the disclosed coating composition is moisture-curable or heat-curable. Examples of a moisture-curable functional group include, but are not limited to, isocyanates or blocked isocyanates. An example of a heat-curable functional group includes, but is not limited to, carbodiimides. An example of radiation-curable functional groups includes, but is not limited to, acrylates.

Furthermore, when the disclosed polymer compositions are used in the preparation of coating compositions, the reactive diluent is capable of forming bonds with the dendritic polymer, for instance through reactions with suitable cross-linkers, to thereby form an integral structure with the dendritic polymer backbone. Advantageously, by becoming integrated into the dendritic polymer backbone, the reactive diluent is substantially prevented from evaporating out of the coating composition, further reducing the VOC emission of coatings prepared from the disclosed polymer compositions.

Further advantageously, as a consequence of requiring little or no organic solvent in the polymer composition, the disclosed compositions possess a relatively high concentration of polymerized solids (or "high solids content") compared to conventional solvent-based polymer compositions. A high solids content is advantageous in that for a same thickness of coating film, a lesser amount of such high solids content polymer compositions is needed compared to polymer compositions having a lower solids content, for providing comparable coating properties.

In a second aspect, there is provided a method of preparing a high solids, two-component (2K) coating composition, said method comprising the steps of: (a) providing a first component comprising: (i) one or more functionalized dendritic polymers; (ii) a reactive diluent capable of being chemically coupled to the functional groups of the dendritic polymers, wherein when said dendritic polymer is coupled to said reactive diluent in the presence of a cross-linker, a polymerized solid is formed at high concentrations in a liquid medium; and (b) providing a second component comprising; (i) one or more cross-linkers; (c) mixing said first and second components to form said coating composition.

Advantageously, the disclosed method may be performed without the use of an organic solvent or with substantially reduced amounts of an organic solvent to thereby form coatings with near-zero or zero VOC emissions. Further advantageously, as the dendritic polymers are miscible with the reactive diluent, the said first component is stable for prolonged storage even in the absence of solvent and may be mixed with cross-linkers just prior to applying the coating composition onto a surface.

In a third aspect, there is provided a method of preparing a high solids, single component (1K) coating composition, said method comprising the steps of: providing a polymer composition comprising: (i) one or more functionalized dendritic polymers; (ii) a reactive diluent capable of being chemically coupled to the functional groups of the dendritic polymers, wherein when said dendritic polymer is coupled to said reactive diluent in the presence of a cross-linker, a polymerized solid is formed at high concentrations in a liquid medium; and (iii) one or more blocked cross-linkers.

Advantageously, the coating composition may be curable upon the application of heat. In one embodiment, the 1K coating composition can be cured by heating the coating composition to unblock the cross-linkers so that they may react with the functional groups of the dendritic polymer to form a cross-linked network thereof.

Advantageously, the disclosed method of the third aspect may be performed without the use of an organic solvent or with substantially reduced amounts of organic solvent to thereby form coating compositions with substantially reduced or zero VOC emissions.

In yet another aspect, there is provided a coating composition comprising: (i) one or more functionalized dendritic polymers; and (ii) a reactive diluent that is capable of being chemically coupled to the functional groups of the dendritic polymers, wherein when said dendritic polymer is coupled to said reactive diluent in the presence of a cross-linker, a polymerized solid is formed at high concentrations in a liquid medium; and (iii) one or more cross-linkers.

In another aspect, there is provided the polymer composition according to the first aspect for use in the preparation of a single component (1K) coating composition wherein the dendritic polymer, reactive diluent and cross-linker are in a single component.

In still another aspect, there is provided the polymer composition according to the first aspect for use in the preparation of a two-component (2K) coating composition wherein the dendritic polymer and the reactive diluent are in one component and a crosslinker is in the other component.

Definitions

The following words and terms used herein shall have the meaning indicated:

As used herein, the terms "organic solvent" or "solvent" are used interchangeably throughout the present specification to refer to organic compounds capable of dissolving substantially hydrophobic polymers. Exemplary solvents may include but are not limited to non-polar and aprotic solvents, such as, acetones, dichloromethane (DCM), tetrahydrofuran (THF), ethyl acetate (EtOAc), dimethylformamide (DMF), acetonitrile, and dimethyl sulfoxide (DMSO), butyl acetate (BA) and or mixtures thereof.

As used herein, the term "solids content" is taken to refer to the concentration of non-volatile material (such as polymerized solids) contained in a polymer composition. More particularly, the term refers to the non-volatile material left behind after volatile components such as a solvent (which serves as a carrier or vehicle for the polymer composition) has been removed from the polymer composition.

As used herein, the term "high solids content" when used to describe a polymer composition, refers to a polymer composition that has at least a concentration of 55% of non-volatile material remaining after volatile material in the polymer composition have been removed from the composition.

The term "radiation-curable composition", as used in the context of the present specification, shall be taken to refer to a composition comprising a polymer having functional groups capable of forming covalent bonds with chain extenders, cross-linkers or other polymer molecules upon exposure to electromagnetic radiation, including ultra-violet (UV) radiation, to form a cross-linked polymer network.

The term "heat-curable composition", as used in the context of the present specification, shall be taken to refer to a composition comprising a polymer having functional groups capable of forming covalent bonds with chain extenders, cross-linkers or other polymer molecules upon application of heat, to form a cross-linked polymer network.

The term "moisture-curable composition", as used in the context of the present specification, shall be taken to refer to a composition comprising a polymer having functional groups capable of forming covalent bonds with chain extenders, cross-linkers or other polymer molecules in the presence of water or —OH containing compounds, to form a cross-linked polymer network.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF OPTIONAL EMBODIMENTS

Exemplary, non-limiting embodiments of a polymer composition according to the first aspect will now be disclosed.

In one embodiment, the disclosed polymer composition comprises an organic solvent. The organic solvent may be present in an amount of about 45% by weight, about 40% by weight, about 35% by weight, about 30% by weight, about 25% by weight, about 20% by weight, about 15% by weight, about 10% by weight, or about 5% by weight or less. In a preferred embodiment, the disclosed polymer composition is substantially free of an organic solvent.

In one embodiment, the disclosed polymer composition may have solids content of about 60% by weight or more, about 65% by weight or more, about 70% by weight or more, about 75% by weight or more, about 80% by weight or more, about 85% by weight or more, about 90% by weight or more, or about 95% by weight or more. In a preferred embodiment, the solids content of the disclosed polymer composition is about 100%.

The reactive diluent may have a relatively low molecular weight compared to the dendritic polymer. In one embodiment, the disclosed reactive diluent may be selected from one or more compounds having an average molecular weight of less than or equal to 500. In another embodiment, the reactive diluent may have an average molecular weight of less than 400. In yet another embodiment, the disclosed reactive diluent may have an average molecular weight of 300 or lesser. In yet another embodiment, the disclosed reactive diluent may have an average molecular weight of 200 or lesser.

The reactive diluent may be selected to be a liquid at room temperature. In one embodiment, the reactive diluent is selected to have a melting point of lower than 20° C. In another embodiment, the reactive diluent is selected to have a melting point of less than 10° C. In still another embodiment, the reactive diluent is selected to have a melting point of less than 0° C.

Concurrently, the reactive diluent may also be selected to have boiling points greater than 150° C. Preferably, the reactive diluent has a boiling point of greater than 200° C. Even more preferably, the reactive diluent is selected to have a boiling point of greater than 250° C. Advantageously, this may aid to prevent the reactive diluent from evaporating out of the polymer composition during a post-processing step, such as heat curing of a coating prepared from the polymer composition.

The reactive diluent may also comprise one or more distinct compounds, each compound having two or more functional groups selected from the group consisting of: hydroxyl functional group, amino functional group, halogen functional group and carboxyl functional group. In one embodiment, the reactive diluent may comprise two or more hydroxyl functional group per molecule of reactive diluent.

The reactive diluent may be selected from any suitable class of compounds that are capable of being miscible with the dendritic polymers. In one embodiment, the reactive diluent may be selected from the group consisting of: alcohols, carboxylic acids, halogenated alkyls, halogenated olefins, amines, alkylamines, alkenylamines, olefinic alcohol, cycloalkyl alcohol, cycloalkenyl alcohol and mixtures thereof. In one embodiment, the reactive diluent may be cycloalkyl alcohol. In yet another embodiment, the reactive diluent may be cycloalkyl diol. In a preferred embodiment, the reactive diluent may be selected from 1,3-cyclohexane dimethanol and/or 1,4-cyclohexane dimethanol.

The disclosed polymer composition may be in solution form, wherein the solution comprises the dendritic polymers in admixture with the reactive diluent. In one embodiment, the weight ratio of the dendritic polymers to the reactive diluent is from about 1:50 to about 1:2. In one embodiment, the weight ratio of the dendritic polymer to reactive diluent may be about 1:40, about 1:35, about 1:30, about 1:25, about 1:20, about 1:15, about 1:10, about 1:9, about 1:8, about 1:7, about 1:6, about 1:5, 1:4 or about 1:3.

In the disclosed polymer composition, the one or more dendritic polymers may be hydroxyl functional dendritic polymers. The hydroxyl functional dendritic polymers may have a theoretical number of about 16 to about 128 peripheral hydroxyl functional groups per molecule of dendritic polymer. In one embodiment, the hydroxyl functional dendritic polymers are selected to have an average of about 20 to about 80 peripheral hydroxyl functional groups per molecule of dendritic polymer. In one embodiment, the dendritic polymers may have an average theoretical number of 64 hydroxyl groups per molecule of dendritic polymer.

The disclosed polymer composition may further comprise one or more cross-linkers. Any cross-linker compound comprising a functional moiety capable of reacting with the peripheral hydroxyl groups of the dendrimer to form covalent bonds, may be used as a cross-linker in the disclosed composition.

Exemplary cross-linkers may be selected from, but are not limited to, the group consisting of: polyisocyanates, blocked polyisocyanates, melamine formaldehyde resins, epoxy resins, carbodiimide compounds, and aziridine-functional compounds.

In one embodiment, the functional moiety may be an aliphatic or aromatic isocyanate comprising the cross-linkable moiety (—N═C═O). In one embodiment, the cross-linker may have a general formula R—N═C═O, wherein R may be selected from substituted or non-substituted, aliphatic or aromatic alkyls, alkenyls, aryls and the like.

In another embodiment, the cross-linker may be a diisocyanate having a general formula O═C═N—$R_1$—$R_2$—N═C═O, wherein $R_1$ and $R_2$, being same or different, may be independently selected from substituted or non-substituted, aliphatic or aromatic, alkyls, alkenyls, aryls and the like.

In one embodiment, the cross-linker is selected from the group consisting of: diphenylmethane 4,4'-diisocyanate, methylenebis-4,4'-isocyanatocyclohexane, 1,6-hexamethylene diisocyanate (HDI), 1,4-cyclohexane diisocyanate, p-phenylene diisocyanate, triphenylmethane-4,4',4",-triiosyanate, methylene diphenyl diisocyanate (MDI), toluene diisocyanate (TDI), tetramethylxylene diisocyanate, isophorone diisocyanate (IPDI) and mixtures thereof. It is preferred that the cross-linkers are high order isocyanates compounds, having at least two, and preferably at least three or four isocyanate moieties for each cross-linker molecule.

The cross-linker may also be a blocked compound wherein its cross-linkable moiety is chemically reacted with a blocking agent to substantially prevent it from reacting with the dendritic polymers. In one embodiment, the cross-linker can be a blocked isocyanate selected from the list disclosed above. The blocked isocyanate may be used in 1K coating compositions wherein the cross-linker is provided in admixture with the polymer composition and does not require a separate mixing step prior to applying the composition as a coating onto a surface. In one embodiment, the blocked isocyanate may be freed for reaction via the application of heat.

For example, blocked isocyanates are not used in 2K systems where the polymer composition and the cross-linkers are in separate components and are respectively mixed shortly before applying the resultant coating composition as a coating onto a surface.

The cross-linker may also be selected from melamine formaldehyde resins. In one embodiment, the melamine formaldehyde resin is a hexamethoxymethyl-melamine formaldehyde resin. In another embodiment, the cross-linker may be a melamine resin such as a methylated, butylated melamine resin.

The disclosed polymer composition may further comprise an acrylate functional dendritic polymer. In one embodiment, the polymer composition may comprise, in admixture with at least one hydroxyl functional dendritic polymer, an acrylate-functional dendritic polymer.

The acrylate-functional dendritic polymer may contain acrylate functional groups ($CH_2$=CHCOO—) attached to the peripheral surface of the acrylate-functional dendritic polymer. The acrylate-functional dendritic polymer may have a theoretical amount of about 10 to about 64 peripheral acrylate functional groups per molecule of the acrylate-functional dendritic polymer. In another embodiment, the theoretical amount of acrylate functional groups is about 20, about 30, about 40 about 50, or about 60 per molecule of acrylate-functional dendrimer.

The acrylate-functional dendritic polymer may be present in the disclosed polymer composition in an amount of at least 1% by weight or more based on the total weight of the polymer composition. In another embodiment, the acrylate-functional dendritic polymer is present in an amount of at least 10% by weight or more. In another embodiment, the acrylate-functional dendritic polymer is present in an amount of at least 20% by weight or more.

In one embodiment, the acrylate-functional dendritic polymers may be a hyperbranched polyester acrylate dendrimer. Advantageously, the presence of the acrylate-functional dendritic polymer makes it possible to perform ultra-violet or electron beam (EB) curing of a coating formed from the disclosed polymer composition.

The disclosed polymer composition may further comprise one or more additive compounds selected from ultra-violet (UV) photo-initiators, such as α-hydroxyketone, α-aminoketone, phenylglyoxylate, phosphine oxide and mixtures thereof.

The disclosed polymer composition may further comprise one or more catalysts, polyols, surfactants and nanoparticles.

The nanoparticles may be metal oxide nanoparticles. In one embodiment, the metal oxide nanoparticles are selected from oxides of aluminum and zinc. Typically, when added into the polymer composition, the average particle size of the nanoparticles ranges from about 1 nm to about 500 nm. In another embodiment, these nanoparticles may be encapsulated within a polymer which has been suitably functionalized for cross-linking with the dendritic polymers.

In one embodiment, the catalyst may be selected from organometallic compounds or tertiary amines. Exemplary catalysts may include a dibutyltin compound, such as dibutyltin dilaurate and dibutyltin diacetate, Triethylenediamine (TEDA), Triethylamine (TEA), Triethanolamine, N,N-dimethylethanolamine (DMEA), N,N-dimethylpiperazine and N-ethylmorpholine. In another embodiment, the catalyst may be a strong acid or a weak acid, such as a sulfonic acid. Exemplary acid catalysts may include dodecylbenzyl sulfonic acid, p-toluenesulfonic acid, dinonylnapthalene disulphonic acid (DNNDSA), dodecyl benzene sulphonic acid (DDBSA), dinonylnapthalene monosulphonic acid (DNNSA), phosphates such as alkyl acid phosphates, metal salts and carboxylic acids. In the embodiment where the cross-linkers used belong to the class of melamine and epoxy resins, acid catalysts are used. In the embodiment where the cross-linkers used belong to the class of isocyanates, organometallic compounds and tertiary amines are used as catalysts.

The polymer composition may further comprise one or more silane compounds. In one embodiment, the silane compounds may comprise at least one reactive group capable of reacting with an inorganic compound and at least one organofunctional group capable of reacting with an organic compound.

In one embodiment, the silane compounds are organosilanes having the general structure:

$$(Z)_3-Si-(CH_2)_n-X$$

wherein (Z) is a reactive hydrolysable group selected from a halide or an (OR) group, wherein R is hydrogen (H), acetoxy or an alkyl group having 1 to 6 carbon atoms;

X is a organofunctional group, selected from amine, amino, amine, hydroxyl, carboxyl, epoxide, methacrylate, mercaptan (SH), alkyl, alkylene, vinyl, isocyanate, carbamate and combinations thereof; and n is an integer from 1 to 10.

In one embodiment, the halide group can be selected from the group consisting of fluoride (F), bromide (Br) chloride (Cl) and iodide (I). In one embodiment, Z is Cl.

In one embodiment, R is selected from methyl, ethyl or phenyl. In another embodiment, R is —$CH_3C$=O (acetoxy).

In one embodiment, the organosilane can be a bifunctional organosilane, that is, having a general formula:

$$(Z^1)_3-Si-(CH_2)_m-X-(CH_2)_n-Si-(Z^2)_3$$

wherein X is as defined above;

($Z^1$) and ($Z^2$), being same or different, are as defined above;

n and m are integers, independently selected from 1 to 10.

In one embodiment, the organosilane compound is a bifunctional trimethoxysilyl aminosilane, wherein X is amino and where ($Z^2$) and ($Z^1$) are methoxy.

In another embodiment, the organosilane compound is a monofunctional trimethoxysilyl epoxysilane, wherein X is epoxy and ($Z^2$) and ($Z^1$) are methoxy.

The silane compounds may be present in an amount of at least about 0.01% by weight based on the total weight of the polymer composition. In another embodiment, the silane compounds may be in an amount from about 0.01% to about 10% by weight based on the total weight of the polymer composition. In yet another embodiment, the silane compounds may be present in an amount of about 25%, about 30%, about 35%, about 40%, about 45%, about 50%, about 55%, about 60%, about 65%, about 70%, about 75%, about 80%, about 85%, about 90% or about 95% by weight, based on the total weight of the polymer composition.

Advantageously, the silane compounds may help to improve the adhesion properties of a coating formed from the disclosed polymer composition. In particular, the silane compounds may improve the ability of the formed coating to adhere to inorganic substrates, such as glass or ceramics. Further advantageously, the silane compounds may also act as cross-linkers to promote cross-linking between the dendritic polymers, thereby increasing the cross-linking density. As a result, the formed coatings may exhibit improved hardness, chemical and moisture resistance.

Exemplary, non-limiting embodiments of the method according to the second aspect will now be disclosed.

The providing step (a) of the disclosed method may further comprise, prior to said providing step (a), mixing the dendritic polymer and the reactive diluent under temperatures of up to 150° C. to form a homogeneous polymer solution. Optionally, an aqueous or organic solvent may be added to the homogeneous polymer solution to form said first component.

During the mixing step, the dendritic polymers and the reactive diluent may be mixed in a weight ratio of dendritic polymers:reactive diluent of about 1:50 to about 1:2. In another embodiment, the reactive diluent may be mixed in a weight ratio of dendritic polymers:reactive diluent of about 1:40, about 1:35, about 1:30, about 1:25, about 1:20, about 1:15, about 1:10, about 1:9, about 1:8, about 1:7, about 1:6, about 1:5, 1:4 or about 1:3. In one embodiment, the reactive diluent may be mixed in a weight ratio of dendritic polymers:reactive diluent of about 1:20 to about 1:2.

The providing step (a) of the disclosed method may further comprise providing one or more additives to the first component, including but not limited to, surfactants, catalysts, and moisture scavengers.

The solvent, when added, may be provided in an amount of 45% or less, 40% or less, 35% or less, 30% or less, 25% or less, 20% or less, 15% or less, 10% or less, 5% or less by weight. In one embodiment of the disclosed method, the solvent is not added to the polymer solution.

Advantageously, this allows for the preparation of a high solids coating composition in accordance with the disclosed method. In one embodiment, the coating composition formed from the disclosed method has a solids content of at least 55%, at least 60%, at least 65%, at least 70%, at least 75%, at least 80%, at least 85%, at least 90%, at least 95% and up to 100% by weight.

Exemplary, non-limiting embodiments of the method according to the third aspect will now be disclosed.

In the disclosed method for preparing a single component coating composition, the providing step (a) may further comprise, prior to said providing step (a), mixing the dendritic polymer and the reactive diluent under temperatures of up to 150° C. to form a homogeneous polymer solution. The homogeneous polymer solution may thereafter be added to a composition comprising optionally an organic or aqueous solvent and one or more blocked cross-linkers to form the single component (1K) coating composition.

During the mixing step, the dendritic polymers and the reactive diluent may be mixed in a weight ratio of dendritic polymers:reactive diluent of about 1:50 to about 1:2. In one embodiment, the mixing step may comprise mixing the dendritic polymers and reactive diluent in a dendritic polymers:reactive diluent weight ratio of about 1:40, about 1:35, about 1:30, about 1:25, about 1:20, about 1:15, about 1:10, about 1:9, about 1:8, about 1:7, about 1:6, about 1:5, 1:4 or about 1:3.

When provided, the solvent may be provided in an amount of 45% or less, 40% or less, 35% or less, 30% or less, 25% or less, 20% or less, 15% or less, 10% or less, 5% or less by weight. In one embodiment of the disclosed method, the solvent is not provided in said providing step (a).

Advantageously, this allows for the preparation of a high solids, 1K coating composition in accordance with the disclosed method. In one embodiment, the coating composition formed from the disclosed method has a solids content of at least 55%, at least 60%, at least 65%, at least 70%, at least 75%, at least 80%, at least 85%, at least 90%, at least 95% and up to 100% by weight.

The disclosed method may comprise a step of applying heat to the polymer composition to cure the coating system. In another embodiment, the above disclosed methods may further comprise a step of ultra-violet curing.

EXAMPLES

Non-limiting examples of the invention will be further described in greater detail by reference to specific Examples, which should not be construed as in any way limiting the scope of the invention.

Materials Used

Below is a list of the raw materials used in the following Examples. The commercial names (in bold) of the following raw chemicals will be used in the Examples for convenience.

1. Dendritic polymer with theoretically 64 peripheral hydroxyl groups, having a molecular weight of about 5100 g/mol solid, OH value 470-500, ("Boltorn® H40") procured from Perstorp Singapore Pte Ltd.
2. Dendritic polymer with theoretically 16 primary hydroxyl groups and a molecular weight of 1747 g/mole solid, OH value 490-530, ("Boltorn® H20") procured from Perstorp Singapore Pte Ltd.
3. Cycloaliphatic diol that is composed of approximately a 1:1 ratio of (cis,trans)-1,3-cyclohexanedimethanol and (cis,trans)-1,4-cyclohexanedimethanol, with a molecular weight of 144.21, hydroxyl number of 778, ("Unoxol™ Diol") procured from Dow Chemical Pacific (Singapore) Pte Ltd.
4. Hexamethylene diisocyanate (HDI), with NCO content about 23% ("Desmodur® N3600") procured from Bayer MaterialScience AG.
5. A mixed methylated-butylated (55/45) melamine resin, with >98% solid ("Resimene® 755") procured from Ineos Melamines, Germany.
6. An epoxy functional silane ("Silquest A-187®") procured from Momentive Performance Materials.
7. A low viscosity and high functionality acrylate dendritic oligomer ("CN 2302") procured from SARTOMER COMPANY.
8. A UV cure photoinitiator ("IRGACURE® 500") procured from Ciba.

Testing Methods

In the following Examples, the following industrially recognized testing methods are used to characterize the water-dispersible coatings:

Viscosity (Brookfield LVT viscometer): ASTM D2196-86;
Adhesion (1 mm×1 mm): ASTM D3359;
Impact (as measured in Inch (in)·pounds (lb) (direct), in·lb): ASTM D2794;

Pencil Hardness (Break/Scratch): ASTM D3363;
Flexibility (⅛"): ASTM D5222;

In addition, a methyl ethyl ketone ("MEK") rub test is used to determine the degree of cure of the coating composition by the resistance of the composition to MEK. The following protocol will be adopted for the methyl MEK rub test:

(i) Prepare film on a glass panel with 100 μm wet film thickness ("WFT");
(ii) Dry the panel at a predetermined temperature for a predetermined duration (temperature and curing time depend on specific coatings) prior to testing;
(iii) Saturate a cotton bud with MEK and hold it at 45° angle to the test surface, rub the test surface with moderate pressure. A complete rub consisting of one forwards rub and one backwards rub motion is considered one double rub. The surface is rubbed continuously until the substrate glass panel is exposed. Record the total number of double rubs.

Example 1(a)

Preparation of Dendritic Polymer Solution

Boltorn H40 and Unoxol Diol were mixed in a 100 ml round bottle flask at a weight ratio of Boltorn H40:Unoxol Diol=1:9. The mixture turned homogenous after about 15 to 30 minutes of stirring and a clear resin solution was formed.

Example 1(b)

Preparation of Coating Composition

A two-component (2K) coating composition comprising the dendritic polymer solution of Example 1(a) (H40:Unoxol Diol=1:9) was prepared by mixing the resin solution together with a polyisocyanate cross-linker (Desmodur N3600). The solids content of the resultant coating composition was about 83%.

The two components are termed "Side A" and "Side B" and their respective compositions are shown below in Table 1.

TABLE 1

|  | Name | Weight (%) |
| --- | --- | --- |
| Side A | Resin solution from Example 1(a) | 20.23 |
|  | Solvent (acetone) | 12.55 |
|  | Additive (BYK ® 302) | 0.36 |
|  | Catalyst (1% Dibutyltin Dilaurate (DBTDL) in acetone) | 4.05 |
| Side B | Crosslinker (Desmodur ® N3600) | 62.81 |
|  | Total | 100.00 |

Further, the ratio of peripheral —OH groups of the dendritic polymer solution to the —N═C═O groups of the polyisocyanate cross-linker was about 1:1.3.

Side A and Side B were then mixed together to form a 2K coating composition system, which had a translucent in-can appearance.

Example 1(c)

Characterization of Coating Composition

The 2K coating composition from Example 1(b) was dried at 85° C. for 2 hours. The dry film appearance of the 2K coating composition was clear and glossy.

Using the pencil-hardness test, the 2K coating composition possessed a scratch hardness of 2H and a break hardness of more than 6H.

Additionally, using the MEK rub test, the chemical resistance of the 2K coating composition is more than 500 cycles. The 2K coating composition is also resistant to water, alcohol and alkaline solution as shown in the results provided in Table 2 below.

TABLE 2

| Film Performance | Coating prepared based on Example 1(b) |
| --- | --- |
| 100μ Wet Film Thickness (WFT) on Tin | |
| Pencil Hardness, scratch/Break | 2H/ >6H |
| Adhesion, 1 mm × 1 mm | 0% peel off |
| Impact, In. lb | >80 |
| Flexibility, 1/8" | Pass |
| 100μ Wet Film Thickness (WFT) on Glass | |
| Pencil Hardness, scratch/Break | 2H/2H |
| MEK Double Rub, no. of cycles | >500 |
| Spot Test | |
| Water resistance (24 hrs) | Very slight blisters (recovered within 1 hr) |
| 5% NaOH Solution resistance (24 hrs) | No change |
| 50% Ethanol resistance (1 hr) | No change |

Example 2(a)

Preparation of Coating Composition

A one-component (1K) coating composition comprising the dendritic polymer solution of Example 1(a) (H40:Unoxol Diol=1:9) was prepared by admixing the solution together with a melamine (Resimene 755). The solid content of the total composition was about 100%, i.e., no organic solvent was employed at all.

The components of the coating composition of Example 2(a) is provided in Table 3 below.

TABLE 3

| Name | Weight (%) |
| --- | --- |
| Resin solution from Example 1(a) | 35.19 |
| Catalyst (Nacure ® 5225) | 0.70 |
| Additive (BYK ® 306) | 0.50 |
| Crosslinker (Resimene ® 755) | 63.61 |
| Total | 100.00 |

Further, the ratio of peripheral —OH groups of the dendritic polymer solution to the melamine groups of the cross-linker was about 1:0.9.

Additionally, the 1K melamine coating composition system had a liquid in-can appearance.

Example 2(b)

Characterization of Coating Composition

The 1K coating composition from Example 2(a) was dried by heating the composition from room temperature to 140° C. and maintained at 140° C. for 30 minutes. The dry film appearance of the 1K melamine system was clear and glossy.

Using the pencil-hardness test, the 1K melamine system possessed a scratch hardness of 3H and a break hardness of 5H.

Additionally, using the MEK rub test, the chemical resistance of the 1K melamine system was more than 1500 cycles. The 1K melamine system was also resistant to water, alcohol and alkaline solutions as shown in Table 4 below.

TABLE 4

| Film Performance | Coating prepared based on Example 2 (a) |
|---|---|
| 100μ Wet Film Thickness (WFT) on Tin | |
| Pencil Hardness, scratch/break 100μ Wet Film Thickness(WFT) on Glass | 3H/5H |
| MEK Double Rub, no. of cycles Spot Test | >1500 |
| Water resistance (24 hrs) | No change |
| 5% NaOH Solution resistance (24 hrs) | No change |
| 50% Ethanol resistance (24 hrs) | No change |
| 0.05 mol/L $H_2SO_4$ (24 hrs) | No change |

Example 3(a)

Preparation of Dendritic Polymer Solution

The method described in Example 1(a) was repeated in this Example, except that a lower functionality dendritic polymer (Boltorn H20)™ was used in place of Boltorn H40™ and the weight ratio between the Boltorn H20™ and Unoxol Diol is 1:4. The final product obtained was a clear solution.

Example 3(b)

Preparation of Coating Composition

A 1K coating composition comprising the dendritic polymer solution of Example 3(a) (H20:Unoxol Diol=1:4) was prepared with the method described in Example 2(a). The solid content of the total composition was about 100%.

The components of the coating composition of Example 3(b) is provided in Table 5 below.

TABLE 5

| Name | Weight (%) |
|---|---|
| Resin solution from Example 3(a) | 36.08 |
| Catalyst (Nacure ® 5225) | 0.51 |
| Additive (BYK ® 306) | 0.50 |
| Crosslinker (Resimene ® 755) | 62.91 |
| Total | 100.00 |

In this example, the ratio of the theoretical peripheral —OH groups of the dendritic polymer solution to the melamine functional groups of the cross-linker is about 1:0.9.

The formed 1K melamine coating composition had a liquid in-can appearance.

Example 3(c)

Characterization of Coating Composition

The 1K coating composition from Example 3(b) was dried using the method described in Example 2(b). The dry film appearance of the 1K melamine system was clear and glossy.

Using the pencil-hardness test, the 1K melamine system possessed a scratch hardness of 3H and a break hardness of 5H.

Additionally, using the MEK rub test, the chemical resistance of the 1K melamine system is more than 1500 cycles. The 1K melamine system is also resistant to water, alcohol and alkaline solutions as shown in Table 6 below.

TABLE 6

| Film Performance | Coating prepared based on Example 3(b) |
|---|---|
| 100μ Wet Film Thickness (WFT) on Tin | |
| Pencil Hardness, scratch/break 100μ Wet Film Thickness (WFT) on Glass | 3H/5H |
| MEK Double Rub, no. of cycles Spot Test | >1500 |
| Water resistance (24 hrs) | No change |
| 5% NaOH Solution resistance (24 hrs) | No change |
| 50% Ethanol resistance (24 hrs) | No change |
| 0.05 mol/L $H_2SO_4$ (24 hrs) | No change |

Example 4(a)

Preparation of Coating Composition

The method described in Example 3(b) was repeated in this Example, except that additional components were added into the 1K coating composition. The solid content of the total composition was about 77%.

The components of the coating composition of Example 4(a) are provided in Table 7 below.

TABLE 7

| Name | Weight (%) |
|---|---|
| Resin solution from Example 3(a) | 25 |
| Solvent (n-Butanol) | 23.10 |
| Catalyst (Nacure ® 5225) | 0.75 |
| Additive (EnviroGem ® AD01) | 0.20 |
| Additive (BYK ® 306) | 0.25 |
| Promoter (Silquest ® A-187) | 0.50 |
| Crosslinker (Resimene ® 755) | 41.20 |
| Total | 100.00 |

In this example, the ratio of the theoretical peripheral —OH groups of the dendritic polymer solution to the melamine functional groups of the cross-linker is about 1:0.9.

The formed 1K melamine coating composition system had a liquid in-can appearance.

Example 4(b)

Characterization of Coating Composition

The 1K coating composition from Example 4(a) was dried using the method described in Example 2(b). The dry film appearance of the 1K melamine system was clear and glossy.

Using the pencil-hardness test, the 1K melamine system possessed a scratch hardness of 2H and a break hardness of 5H.

Additionally, using the MEK rub test, the chemical resistance of the 1K melamine system is more than 1500 cycles. The 1K melamine system is also resistant to water, alcohol and alkaline solutions as shown in Table 8 below.

TABLE 8

| Film Performance | Coating prepared based on Example 4 (a) |
|---|---|
| 100μ Wet Film Thickness (WFT) on Tin | |
| Pencil Hardness, scratch/break | 2H/5H |
| 100μ Wet Film Thickness (WFT) on Glass | |
| MEK Double Rub, no. of cycles | >1500 |
| Spot Test | |
| Water resistance (24 hrs) | No change |
| 5% NaOH Solution resistance (24 hrs) | No change |
| 50% Ethanol resistance (24 hrs) | No change |
| 0.05 mol/L $H_2SO_4$ (24 hrs) | Very tiny blisters (recovered) |

Example 5(a)

Preparation of Coating Composition

The method described in Example 2(a) was repeated in this Example, except that additional components were added into the 1K coating composition to produce a 1K UV curable coating composition. The solid content of the total composition was about 85%.

The components in the 1K UV curable coating composition of Example 5(a) are provided in Table 9 below.

TABLE 9

| Name | Weight (%) |
|---|---|
| Resin solution from Example 1(a) | 25.28 |
| Solvent (n-Butanol) | 15.18 |
| Acrylated dendritic polymer (CN 2302) | 25.28 |
| Photoinitiator (Irgacure ® 500) | 3.29 |
| Additive (EnviroGem ® AD01) | 0.17 |
| Additive (BYK ® 306) | 0.25 |
| Catalyst (Nacure ® 5225) | 0.51 |
| Promoter (Silquest A-187 ®) | 0.46 |
| Crosslinker (Resimene ® 747) | 29.58 |
| Total | 100.00 |

In this example, the ratio of the theoretical peripheral —OH groups of the dendritic polymer solution to the melamine functional groups of the cross-linker is about 1:0.9. The composition further comprises of about 25.28 wt % (based on whole formulation) acrylated dendritic polymer (CN 2302).

The formed 1K melamine UV curable coating composition had a liquid in-can appearance.

Example 5(b)

Characterization of Coating Composition

The 1K UV curable coating composition from Example 5(a) was dried by curing with ultraviolet light for 120 seconds, followed with curing by heating in an oven at 140° C. for 30 minutes. The dry film appearance of the dual cure system was clear and glossy.

Using the pencil-hardness test, the dual-cured coating possessed a scratch hardness of 5H and a break hardness of 6H.

Additionally, using the MEK rub test, the chemical resistance of the dual-cured coating is more than 1500 cycles. The dual-cured coating is also resistant to water, alcohol and alkaline solutions as shown in Table 10 below.

TABLE 10

| Film Performance | Coating prepared based on Example 5 (b) |
|---|---|
| 100μ Wet Film Thickness (WFT) on Tin | |
| Pencil Hardness, scratch/break | 5H/6H |
| 100μ Wet Film Thickness (WFT) on Glass | |
| MEK Double Rub, no. of cycles | >1500 |
| Spot Test | |
| Water resistance (24 hrs) | Tiny blisters (recovered) |
| 5% NaOH Solution resistance (24 hrs) | No change |
| 50% Ethanol resistance (24 hrs) | No change |
| 0.05 mol/L $H_2SO_4$ (24 hrs) | Few tiny blisters (recovered) |

Applications

It can be appreciated that the disclosed polymer compositions are capable of producing coatings with near-zero or zero VOC emissions, at least in part due to the relatively low amounts of organic solvent present or a complete absence of organic solvent in the disclosed polymer compositions.

It has been further demonstrated that, through the addition of a reactive diluent in place of conventional organic solvents, the disclosed polymer compositions do not suffer any technical drawbacks in terms of its film forming properties. For instance, it has been shown in the worked Examples that the reactive diluent is fully capable of dissolving the largely hydrophobic dendritic polymers and the resultant mixture is a clear, homogeneous polymer solution. More advantageously, as the reactive diluent is integrally bonded with the dendritic polymer backbone after reaction with cross-linkers, the reactive diluent is prevented from escaping the coating composition as volatile emissions. This feature, coupled with the low amounts or absence of an organic solvent, further mitigates any potential VOC emissions from the formed coatings.

Additionally, it can also be appreciated that as the disclosed polymer compositions do not require or require only very small amounts of an organic solvent, the polymer compositions are capable of exhibiting very high solids content of up to 100% solids by weight. As a result of their high solids content, the disclosed polymer compositions are capable of forming coatings with improved pencil hardness and improved chemical/water resistance.

The disclosed polymer compositions can therefore be used in a wide spectrum of applications that require high performance, low VOC emission coatings, such as, protective coatings, paints, varnishes, sealants, adhesives and other forms of surface coatings.

It will be further be apparent that various modifications and adaptations of the present invention will be apparent to the person skilled in the art after reading the foregoing disclosure without departing from the spirit and scope of the invention and it is intended that all such modifications and adaptations come within the scope of the appended claims.

The invention claimed is:
1. A liquid dendritic polymer coating composition, consisting of:
   (i) one or more functionalized dendritic polymers;
   (ii) a liquid reactive diluent having two or more functional groups, the reactive diluent having a boiling point of greater than 250° C.,
      wherein said reactive diluent comprises one or more compounds, each compound having two or more func- tional groups selected from the group consisting of: hydroxyl functional group, amino functional group, halogen functional group and carboxyl functional group; or wherein said reactive diluent having two or more functional groups is selected from alcohols, carboxylic acids, halogenated alkyls, halogenated olefins, amines, alkylamines, alkenylamines, olefinic alcohol, cycloalkyl alcohol, cycloalkenyl alcohol and mixtures thereof;

(iii) one or more cross-linkers;

(iv) a solvent in an amount of about 45 wt % or less based on the weight of the coating composition; and (v) optionally, one or more compounds selected from the group consisting of: UV photo-initiator, catalyst, polyol, surfactant, silane compound and polyether-modified polydimethylsiloxane;

wherein, the weight ratio of said dendritic polymer to said reactive diluent is from about 1:50 to about 1:9.

2. The liquid dendritic polymer coating composition of claim 1, wherein said solvent is absent.

3. The liquid dendritic polymer coating composition of claim 1, wherein said reactive diluent is selected from one or more compounds having an average molecular weight of less than or equal to 500, or less than or equal to 200.

4. The liquid dendritic polymer coating composition of claim 1, wherein said reactive diluent is a cycloalkyl diol having two hydroxyl functional groups.

5. The liquid dendritic polymer coating composition of claim 1, wherein said dendritic polymer is a hydroxyl functional dendritic polymer having a theoretical number of from about 16 to about 128 hydroxyl groups per dendritic polymer molecule.

6. The liquid dendritic polymer coating composition of claim 1, wherein said one or more cross-linkers are selected from the group consisting of: polyisocyanates, blocked polyisocyanates, melamine formaldehyde resins, epoxy resins, carbodiimide compounds, aziridine-functional compounds.

7. The liquid dendritic polymer coating composition of claim 1, wherein the coating composition is a 1K coating composition wherein said dendritic polymer, reactive diluent and said cross-linker are provided in a single component.

8. The liquid dendritic polymer coating composition of claim 1, wherein the one or more functionalized dendritic polymers comprises an acrylate functional dendritic polymer.

9. The liquid dendritic polymer coating composition of claim 1, wherein the silane compound is present and wherein said silane compound is a bifunctional organosilane.

10. A two component (2K) liquid dendritic polymer coating composition, consisting of:
a first component consisting of:
(i) one or more functionalized dendritic polymers;
(ii) a liquid reactive diluent having two or more functional groups, the reactive diluent having a boiling point of greater than 250° C.,
wherein said reactive diluent comprises one or more compounds, each compound having two or more functional groups selected from the group consisting of: hydroxyl functional group, amino functional group, halogen functional group and carboxyl functional group; or
wherein said reactive diluent having two or more functional groups is selected from alcohols, carboxylic acids, halogenated alkyls, halogenated olefins, amines, alkylamines, alkenyl amines, olefinic alcohol, cycloalkyl alcohol, cycloalkenyl alcohol and mixtures thereof;
(iii) a solvent in an amount of about 45 wt. % or less based on the total weight of the coating composition; and
(iv) optionally, one or more compounds selected from the group consisting of:
UV photo-initiator, catalyst, polyol, surfactant, silane compound and polyether-modified polydimethylsiloxane;
wherein the weight ratio of said dendritic polymer to said reactive diluent is from about 1:50 to about 1:9; and
a second component consisting of one or more cross-linkers.

11. The two component (2K) coating composition of claim 10, wherein said cross-linkers are polyisocyanates.

12. A method of preparing a high solids, two-part (2K) liquid dendritic polymer coating composition, said method comprising the steps of:
(a) providing a first component consisting of:
(i) one or more functionalized dendritic polymers;
(ii) a liquid reactive diluent having two or more functional groups, the reactive diluent having a boiling point of greater than 250° C.;
(iii) a solvent in an amount of about 45 wt. % or less based on the weight of the coating composition; and
(iv) optionally, one or more compounds selected from the group consisting of: UV photo-initiator, catalyst, polyol, surfactant, silane compound and polyether-modified polydimethylsiloxane,
wherein said reactive diluent comprises one or more compounds, each compound having two or more functional groups selected from the group consisting of: hydroxyl functional group, amino functional group, halogen functional group and carboxyl functional group; or
wherein said reactive diluent having two or more functional groups is selected from alcohols, carboxylic acids, halogenated alkyls, halogenated olefins, amines, alkylamines, alkenyl amines, olefinic alcohol, cycloalkyl alcohol, cycloalkenyl alcohol and mixtures thereof; and
wherein, the weight ratio of said dendritic polymer to said reactive diluent is from about 1:50 to about 1:9;
(b) providing a second component consisting of one or more cross-linkers;
(c) mixing said first and second components to form said coating composition.

13. The method of claim 12, wherein said solvent is absent.

14. A method of preparing a high solids, single component (1K) liquid dendritic polymer coating composition, said method comprising the step of:
(a) providing a liquid dendritic polymer composition consisting of:
(i) one or more functionalized dendritic polymers;
(ii) a liquid reactive diluent having at least two functional groups, the reactive diluent having a boiling point of greater than 250° C.,
wherein said reactive diluent comprises one or more compounds, each compound having two or more functional groups selected from the group consisting of: hydroxyl functional group, amino functional group, halogen functional group and carboxyl functional group; or wherein said reactive diluent having two or more functional groups is selected from alcohols, carboxylic acids, halogenated alkyls, halogenated olefins, amines, alkylamines, alkenyl amines, olefinic alcohol, cycloalkyl alcohol, cycloalkenyl alcohol and mixtures thereof; and wherein the weight ratio of said dendritic polymer to said reactive diluent is from about 1:50 to about 1:9;

(iii) a solvent in an amount of about 45 wt. % or less based on the weight of the coating composition;

(iv) one or more melamine resins and/or blocked cross-linkers; and (v) optionally, one or more compounds selected from the group consisting of: UV photo-initiator, catalyst, polyol, surfactant, silane compound and polyether-modified polydimethylsiloxane.

15. The method of claim 14, wherein said solvent is absent.

16. The method of claim 14, further comprising a step of heat curing said coating composition.

17. The method of claim 16, further comprising a step of ultra-violet curing.

18. The liquid dendritic polymer coating composition of claim 1, wherein the weight ratio of said dendritic polymer to said reactive diluent is about 1:9.

19. The two component (2K) coating composition of claim 10, wherein the weight ratio of said dendritic polymer to said reactive diluent is about 1:94.

20. The method of claim 12, wherein the weight ratio of said dendritic polymer to said reactive diluent is about 1:9.

21. The method of claim 14, wherein the weight ratio of said dendritic polymer to said reactive diluent is about 1:9.

* * * * *